United States Patent
Morris et al.

(10) Patent No.: US 9,267,381 B2
(45) Date of Patent: Feb. 23, 2016

(54) COOLED TURBINE AIRFOIL STRUCTURES

(71) Applicant: HONEYWELL INTERNATIONAL INC., Morristown, NJ (US)

(72) Inventors: Mark C. Morris, Phoenix, AZ (US); Jon Kettinger, Litchfield Park, AZ (US); Deane Krmpotich, Tempe, AZ (US); Stuart Andrew Harman, Sun City, AZ (US); Malak Fouad Malak, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 742 days.

(21) Appl. No.: 13/631,126

(22) Filed: Sep. 28, 2012

(65) Prior Publication Data
US 2014/0093389 A1    Apr. 3, 2014

(51) Int. Cl.
*F01D 5/18* (2006.01)
(52) U.S. Cl.
CPC *F01D 5/183* (2013.01); *F01D 5/18* (2013.01); *F01D 5/187* (2013.01); *F05D 2260/201* (2013.01); *F05D 2260/234* (2013.01); *Y02T 50/676* (2013.01)
(58) Field of Classification Search
CPC ........... F01D 5/18; F01D 5/181; F01D 5/182; F01D 5/183; F01D 5/184; F01D 5/185; F01D 5/186; F01D 5/187; F01D 5/188; F01D 5/189
See application file for complete search history.

(56) References Cited

U.S. PATENT DOCUMENTS

| | | | | |
|---|---|---|---|---|
| 4,738,588 A | * | 4/1988 | Field | 416/97 R |
| 5,382,133 A | * | 1/1995 | Moore et al. | 415/115 |
| 5,511,937 A | * | 4/1996 | Papageorgiou | 415/115 |
| 5,738,493 A | * | 4/1998 | Lee et al. | 416/97 R |
| 5,779,437 A | * | 7/1998 | Abdel-Messeh et al. | 415/115 |
| 5,813,836 A | | 9/1998 | Starkweather | |
| 5,820,337 A | | 10/1998 | Jackson et al. | |
| 6,582,194 B1 | | 6/2003 | Birkner et al. | |
| 6,808,367 B1 | | 10/2004 | Liang | |

(Continued)

FOREIGN PATENT DOCUMENTS

DE    102007055410 A1    5/2008
EP       1091091 A2    4/2001

(Continued)

OTHER PUBLICATIONS

EP Examination Report for EP 13 176 906.9-1610 dated Apr. 27, 2015.

(Continued)

*Primary Examiner* — Nathaniel Wiehe
*Assistant Examiner* — Eldon Brockman
(74) *Attorney, Agent, or Firm* — Ingrassia Fisher & Lorenz, P.C.

(57) ABSTRACT

In accordance with an exemplary embodiment, disclosed is an air-cooled turbine blade having an airfoil shape, including a convex suction side wall, a concave pressure side wall, the walls including an interior surface that defines an interior with the blade, a suction side flow circuit formed within the blade interior, a pressure side flow circuit formed within the blade interior; and a trailing edge pin bank positioned aft of the suction side and pressure side flow circuits. The turbine blade includes a wishbone-shaped architecture at a transition point between the suction side flow circuit and the pressure side flow circuit and the trailing edge pin bank.

5 Claims, 7 Drawing Sheets

(56) References Cited

U.S. PATENT DOCUMENTS

| | | | |
|---|---|---|---|
| 6,837,683 B2 | 1/2005 | Dailey | |
| 6,851,924 B2 * | 2/2005 | Mazzola et al. | 415/115 |
| 6,974,308 B2 | 12/2005 | Halfmann et al. | |
| 7,008,186 B2 | 3/2006 | Heeg et al. | |
| 7,195,458 B2 | 3/2007 | Liang | |
| 7,217,092 B2 | 5/2007 | Lee et al. | |
| 7,232,290 B2 | 6/2007 | Draper et al. | |
| 7,303,376 B2 | 12/2007 | Liang | |
| 7,371,046 B2 | 5/2008 | Lee et al. | |
| 7,488,156 B2 | 2/2009 | Liang | |
| 7,575,414 B2 | 8/2009 | Lee | |
| 7,625,178 B2 | 12/2009 | Morris et al. | |
| 7,967,566 B2 | 6/2011 | Liang | |
| 7,985,049 B1 * | 7/2011 | Liang | 416/97 R |
| 8,052,389 B2 | 11/2011 | Kopmels | |
| 8,182,223 B2 | 5/2012 | Pal et al. | |
| 2007/0128031 A1 | 6/2007 | Liang | |
| 2008/0080979 A1 | 4/2008 | Brassfield et al. | |
| 2010/0040480 A1 | 2/2010 | Webster et al. | |
| 2010/0068068 A1 | 3/2010 | Liang | |
| 2011/0027102 A1 * | 2/2011 | Nakamata et al. | 416/97 R |
| 2011/0236221 A1 | 9/2011 | Campbell | |

FOREIGN PATENT DOCUMENTS

| | | |
|---|---|---|
| EP | 1327747 A2 | 7/2003 |
| EP | 1775420 A2 | 4/2007 |
| GB | 2314126 A | 12/1997 |

OTHER PUBLICATIONS

EP Search Report for Application No. 13 176 906.9 dated Nov. 18, 2013.

EP Examination Report for Application No. 13 176 906.9 dated Dec. 5, 2013.

* cited by examiner

COOLED TURBINE AIRFOIL STRUCTURES

STATEMENT REGARDING FEDERALLY SPONSORED RESEARCH OR DEVELOPMENT

This invention was made with Government support under W911W6-08-02-0011 awarded by the US Army. The Government has certain rights in the invention.

TECHNICAL FIELD

The present invention generally relates to turbine engines, and more particularly relates to turbine engines with cooled airfoil structures.

BACKGROUND

Gas turbine engines, such as turbofan gas turbine engines, may be used to power various types of vehicles and systems, such as, for example, aircraft. Typically, these engines include turbine airfoils (or airfoils) that are impinged by high-energy compressed air that causes a turbine of the engine to rotate at a high speed. Consequently, the airfoils are subjected to high heat and stress loadings which, over time, may reduce their structural integrity.

Modern aircraft jet engines have employed internal cooling systems in the airfoils to maintain the airfoil temperatures within acceptable limits. Typically, the airfoils are air cooled using, for example, bleed air from a compressor section of the engine. The air may enter near the airfoil root, and then flow through a cooling circuit formed in the turbine airfoil. The cooling circuit typically consists of a series of connected cooling passages that form serpentine paths, which increase the cooling effectiveness by extending the length of the air flow path.

One exemplary cooling system is multi-walled and includes independent cooling circuits for the various surfaces of an airfoil, such as pressure and suction side surfaces, to thereby control specific heat load distributions thereon. The walls form intricate passages through which the cooling air flows to feed serpentine thin outer wall passages that incorporate pin fins, turbulators, turning vanes, and other structures therein. Although the cooling system operates adequately to cool most of the airfoil's pressure and suction side surfaces, it has been found that some portions of the airfoil may not be sufficiently cooled. Specifically, in some instances when these portions are exposed to extreme heat environments, they may oxidize, fatigue, and may become prematurely worn.

Hence, there is a need for an improved cooling system that is capable of cooling turbine airfoils in extreme heat environments without allowing the airfoil to fatigue or become prematurely worn. Additionally, it would be desirable for the system to be designed such that the airfoil may be manufactured relatively easily and inexpensively. Furthermore, other desirable features and characteristics of the present invention will become apparent from the subsequent detailed description and the appended claims, taken in conjunction with the accompanying drawings and this background of the invention.

BRIEF SUMMARY

In accordance with an exemplary embodiment, disclosed is an air-cooled turbine blade having an airfoil shape, including a convex suction side wall, a concave pressure side wall, the walls including an interior surface that defines an interior with the blade, a suction side flow circuit formed within the blade interior, a pressure side flow circuit formed within the blade interior, and a trailing edge pin bank positioned aft of the suction side and pressure side flow circuits. The turbine blade includes a wishbone-shaped architecture at a transition point between the suction side flow circuit and the pressure side flow circuit and the trailing edge pin bank.

In accordance with another exemplary embodiment, disclosed is an air-cooled turbine blade having an airfoil shape that includes a convex suction side wall, a concave pressure side wall, the walls including an interior surface that defines an interior with the blade, a suction side flow circuit formed within the blade interior, a pressure side flow circuit formed within the blade interior, and a trailing edge pin bank positioned aft of the suction side and pressure side flow circuits. The pressure side flow circuit includes a plurality of pins positioned on an outer wall of the flow circuit extending towards, but not in contact with, an inner wall of the flow circuit.

In accordance with yet another exemplary embodiment, disclosed is an air-cooled turbine blade having an airfoil shape that includes a convex suction side wall, a concave pressure side wall, the walls including an interior surface that defines an interior with the blade, a suction side flow circuit formed within the blade interior, a pressure side flow circuit formed within the blade interior, a trailing edge pin bank positioned aft of the suction side and pressure side flow circuits, and a platform comprising a first external airfoil fillet on the suction side and a second external airfoil fillet on the pressure side. The external airfoil fillet on the suction side is at least 10% greater in size than the external airfoil fillet on the pressure side. The pressure side flow circuit comprises a plurality of pins positioned on an outer wall of the flow circuit extending towards, but not in contact with, an inner wall of the flow circuit. Further, the turbine blade comprises a wishbone-shaped architecture at a transition point between the suction side flow circuit and the pressure side flow circuit and the trailing edge pin bank.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims. All of the embodiments and implementations of the stator airfoil assemblies and methods for the manufacture thereof described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Certain sections of gas turbine engines that are exposed to hot gasses, hereinafter referred to as "hot sections," require cooled turbine airfoil components when turbine inlet temperatures become high enough to cause distress in uncooled airfoil components. As turbine inlet temperatures continue to increase, more sophisticated cooling schemes are required to satisfy performance and cooling flow requirements. Multi-walled turbine airfoils utilize a thin outer wall to protect the thicker and cooler load-bearing inner walls to thus reduce the bulk metal temperature of the airfoil, which improves stress rupture capability. A typical multi-walled airfoil mid-span temperature distribution between the inner and outer walls results in hot outer walls and cooler inner walls, which in turn results in high thermo-mechanical stresses in the airfoil, due to the relative thermal expansions of the cooler inner walls and ribs with respect to the hotter outer walls. The combination of high temperatures and stresses results in very low thermo-mechanical fatigue (TMF) life, for example, on the order of hundreds or maybe thousands of cycles of life in prior art architectures. However, commercial engine applications typically require tens of thousands of cycles of TMF life. Thus, there is a need for an improved multi-walled turbine airfoil with improved TMF life. Embodiments of the present disclosure address at least this need.

Figure 1:
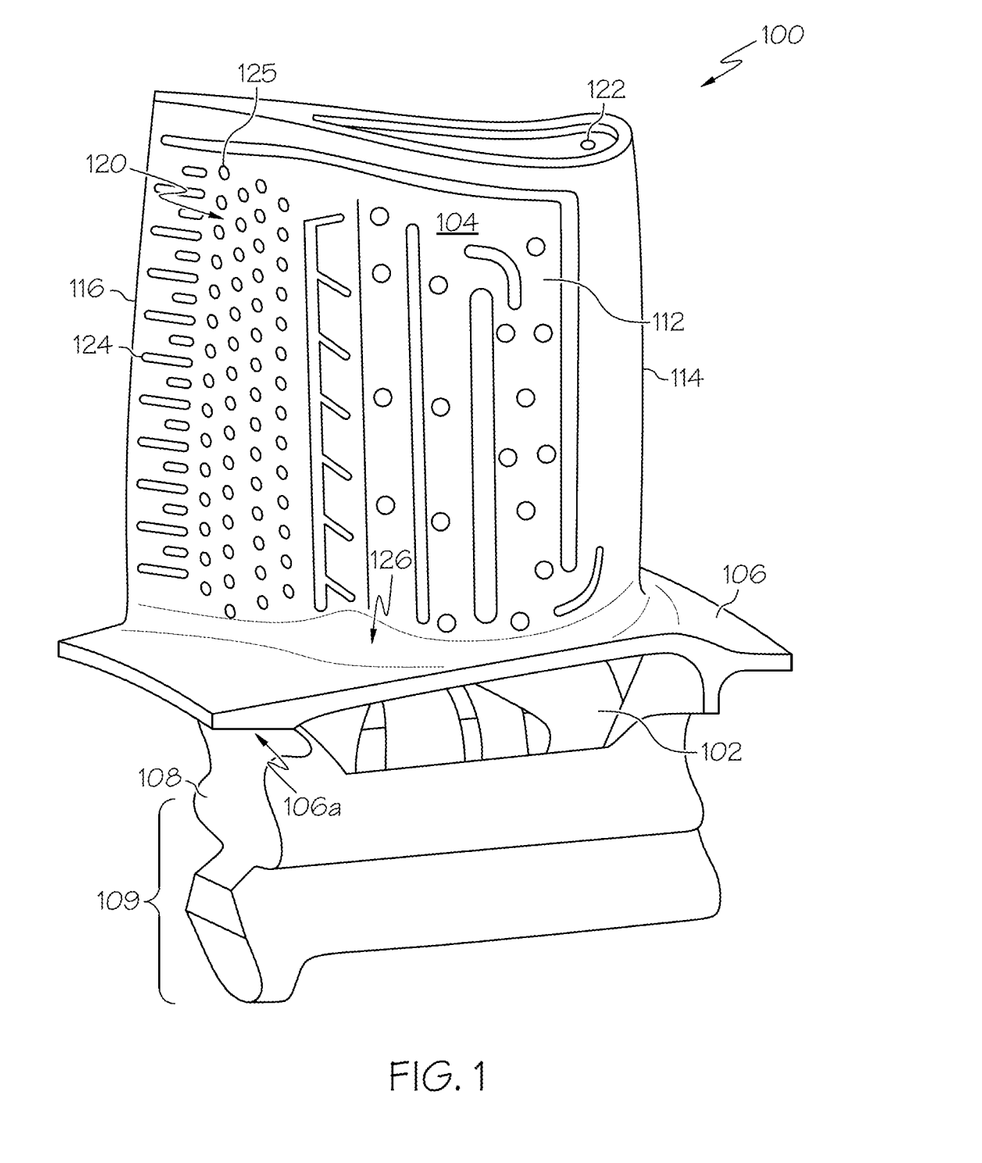
FIG. 1 is a perspective suction (convex) side view of an engine turbine rotor blade that incorporates an exemplary airfoil of the blade.
Figure 2:
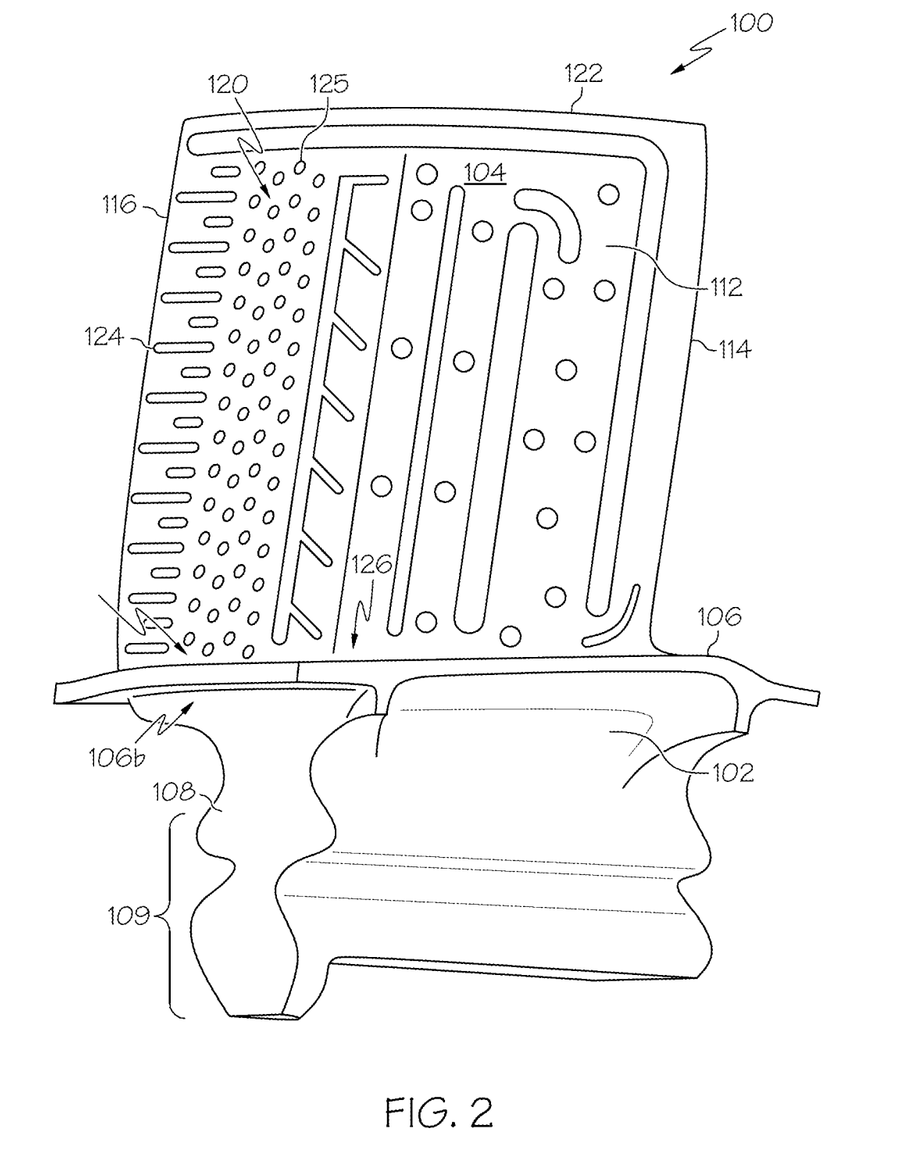
FIG. 2 is another perspective suction side view of a turbine rotor blade of FIG. 1.

Embodiments of the present disclosure provide a thermo-mechanical fatigue (TMF) resistant architecture to reduce thermo-mechanical stresses in multi-wall blades that result in low TMF life. FIGS. 1 and 2 illustrate an exemplary aircraft jet engine turbine rotor blade 100 that includes a shank 102, an airfoil 104, a platform 106, and a root 108. The platform 106 is configured to radially contain turbine airflow. The root 108 provides an area in which a firtree 109 is machined. The firtree 109 is used to attach the blade 100 to a turbine rotor disc (not illustrated). It will be appreciated that in other embodiments, any one of numerous other shapes suitable for attaching the blade 100 to the turbine disc may be alternatively machined therein. The airfoil 104 has two outer walls: a concave outer wall (not shown) and a convex outer wall 112, each having outer surfaces that together define an airfoil shape. The airfoil shape includes a leading edge 114, a trailing edge 116, a pressure side (not shown) along the first outer wall, a suction side 120 along the second outer wall 112, a blade tip 122, one or more trailing edge slots 124, pin fins 125, and an external airfoil fillet 126.

In one embodiment, as shown in FIGS. 1 and 2, the external airfoil fillet 126 is locally increased in size along suction side 120 of the airfoil 104 at the platform 106 to reduce stress concentration from multi-wall cores. As such, the fillet 126 is greater in size along the suction side 120 than a corresponding fillet present on the pressure side. The fillet 126, for example, may be 50%, 100%, 200% (or any percentage thereinbetween) greater in size along the suction size to reduce the concentration of stress on the multi-cored walls. The precise increase in size will be dependent on the configuration of the airfoil, and it is expected that one skilled in the art will be able to utilize finite element analysis methods to optimize the increase in size of the fillet 126 in accordance with a particular design.

In another embodiment, as further shown in FIG. 1, an aft portion of the platform 106a is tapered, i.e., decreased in width in the aft direction, for reduced stresses and higher temperature capability. Similarly, as shown in FIG. 2, a fillet on the underside of the aft portion of the platform 106b is increased in size, also for reduced stresses and higher temperature capability. As used herein, the filet 106b is proportionally increased in size as compared to fillets of similar location known in the art. The fillet 106b, for example, may be 50%, 100%, 200% (or any percentage thereinbetween) greater in size. This configuration improves the platform life and avoids platform distress seen in the prior art. In alternative embodiments, the platform fillet 106b may be a local addition to attenuate the local stress concentration in the platform similarly to employing localized fillet 126 on the external airfoil fillet.

To reduce metal fatigue in the leading edge impingement cavity, the leading edge impingement cavity pressure side and suction side film rows may be moved forward out of high stress fillets using multi-angle forward swept cooling holes to maintain optimal film cooling. These cooling holes utilize multiple angles to avoid breaking into the outer skin cores, and can be located forward of high stress fillet regions to provide film cooling. Greater detail regarding these cooling holes is provided in co-pending U.S. patent application Ser. No. 13/465,647, filed on 7 May 2012, the contents of which are herein incorporated by reference in their entirety, and is also provided with regard to FIGS. 3 and 4, below.

Figure 3:
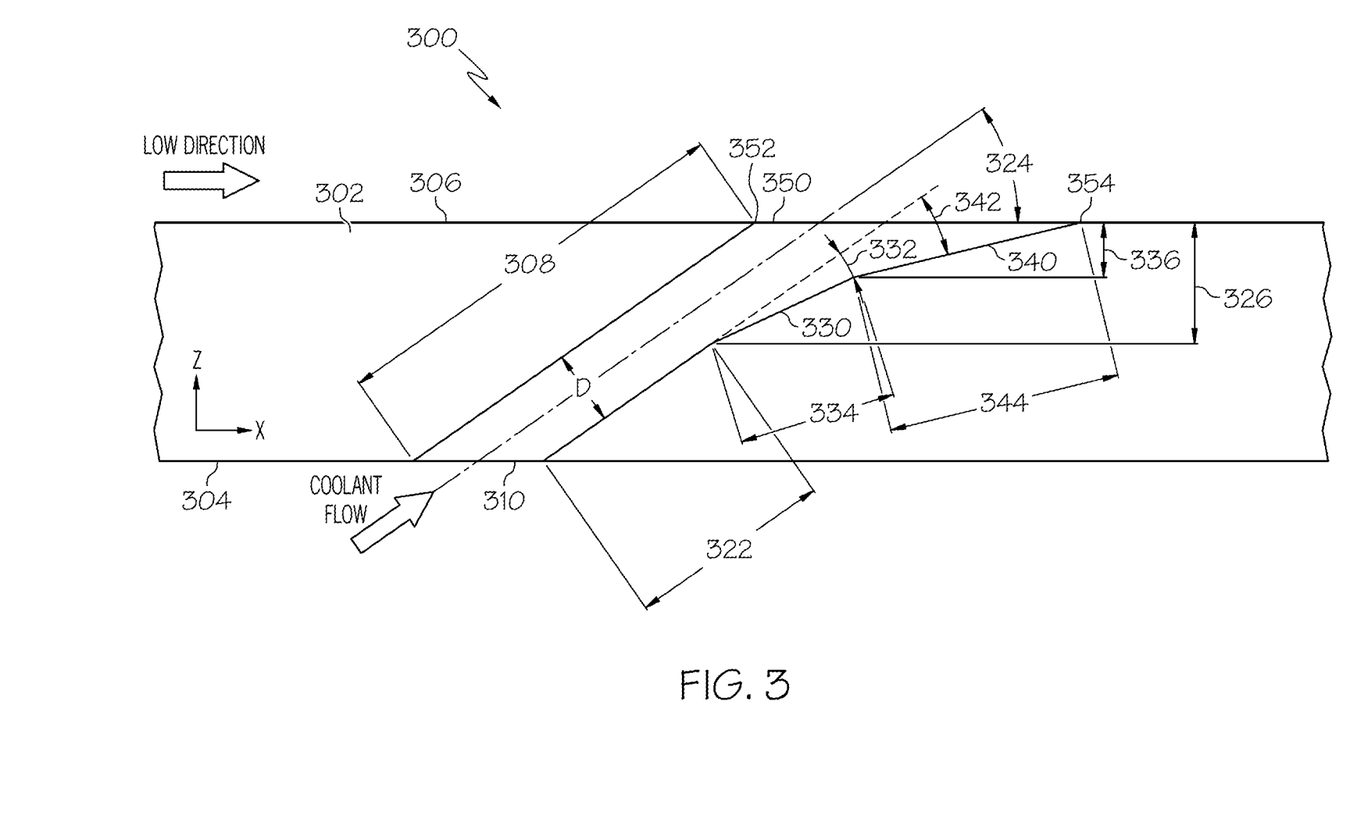
FIG. 3 is a cross-sectional view of a cooling hole in accordance with an exemplary embodiment.

FIG. 3 is a cross-sectional view of a cooling hole 300, which may correspond to the cooling holes used in turbine airfoils, although cooling hole 300 may represent a cooling hole in any engine component. The cooling hole 300 extends through a wall 302 between an inner surface 304 and an outer surface 306 at a longitudinal length 308. The inner surface 304 forms a portion of a cooling circuit to receive cooling flow, and the outer surface 306 is exposed to the mainstream hot gas flow. Generally, the cooing hole 300 includes an inlet 310, a relatively straight metering portion 322, a first exit portion 330, a second exit portion 340, and an outlet 350. The inlet 310 may be any suitable shape, such as oval, and defined in the inner surface 304. The metering portion 322 extends from the inlet 310 and may have a size, shape, and length to meter the appropriate amount of cooling air through the hole 300. The metering portion 322 may be inclined relative to the outer surface 306 at any suitable angle 324 and extend to any suitable depth, e.g., from the inner surface 304 to a depth 326 from the outer surface 306. In one exemplary embodiment, the metering portion 322 may be inclined relative to the inner surface 304 at an angle of 20°-35°, as examples.

The first exit portion 330 extends from the metering portion 322. The first exit portion 330 may have any suitable shape, including the shapes described in greater detail below. The first exit portion 330 extends at an angle 332 relative to the metering portion 322 at a length 334, e.g. from the depth 326 of the metering portion 322 to depth 336 relative to the outer surface 306. The second exit portion 340 extends from the first exit portion 330. The second exit portion 340 may have any suitable shape, including the shapes described in greater detail below. The second exit portion 340 extends at an angle 342 relative to the metering portion 322 at a length 344, e.g., from the depth 336 to the outer surface 306. Like the first and second exit portions 330, 340, the outlet 350 may have any suitable shape, including the shapes described in greater detail below. The outlet 350 may be considered to have a leading edge 352 and a trailing edge 354, which generally refer to the orientation of the hole 300 relative to mainstream gas flow. As shown in FIG. 3, the angle 342 of the second exit portion 340 is greater that the angle 332 of the first exit portion 330 such that the hole 300 may be considered to have a forward sweep configuration. Although the hole 300 has two, generally increasing angled portions (e.g., angles 332 and 342), other exemplary embodiments may have additional exit portions with further increasing angles.

Figure 4:
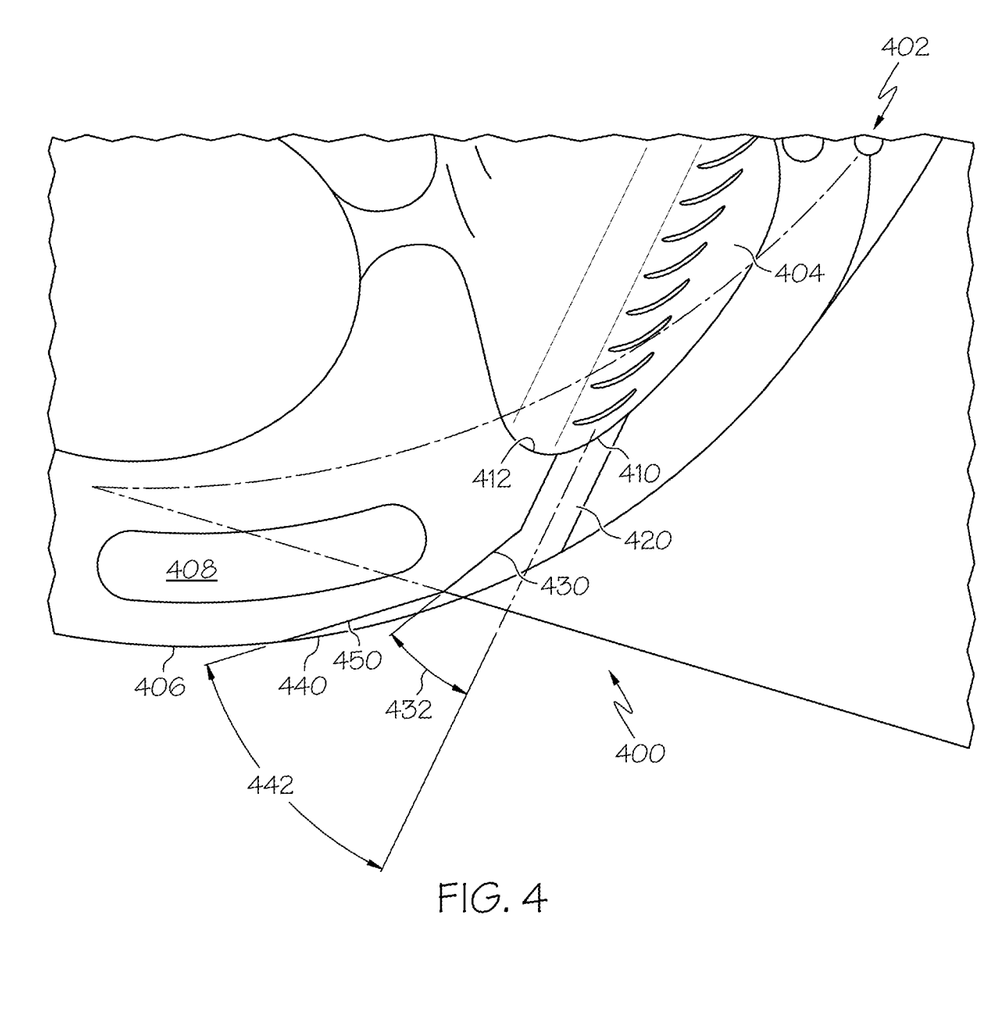
FIG. 4 is a cross-sectional view of a portion of a blade in accordance with an exemplary embodiment.

In some embodiments, increasing the angle of the second exit portion 340 relative to the first exit portion 330 enables the placement of cooling flow in areas that may have been previously unavailable for cooling. For example, FIG. 4 is a cross-sectional view of a cooling hole 400, similar to the cooling hole 300 of FIG. 3, incorporated into an airfoil 402. As above, the cooing hole 400 includes an inlet 410, a relatively straight metering portion 420, a first exit portion 430, a second exit portion 440, and an outlet 450. The inlet 410 may be any suitable shape, such as oval, and receives cooling air flow from cavity (or circuit portion) 404. The metering portion 420 extends from the inlet 410 and may function to meter the appropriate amount of cooling air through the hole 400. The first exit portion 430 extends from the metering portion 420 at a first angle 432, and the second exit portion 440 extends from the first exit portion 430 at a second angle 442 relative to the metering portion 420. As a result of the angles 432, 442, the cooling hole 400 is configured to provide cooling air to a location (e.g., location 406) that is a relatively large distance from the cavity 404, which may be an area that may otherwise be difficult to cool. For example, because of metering, air flow considerations, or source issues, it may be otherwise difficult to provide cooling air from a closer cavity (e.g., cavity 408) to location 406. Similarly, without angles 432, 442, it would be difficult to provide cooling air from cavity 404 to location 406, e.g., cavity 408 may otherwise impede or prevent a direct cooling hole or a simple compound cooling hole from delivering cooling air flow directly to location 406. Utilization of the multi-forward angle swept cooling hole 400 allows the inlet 410 to be moved away from the high stressed fillet 412, which concentrates the thermal stresses due to thermal gradients between the cooler inner walls (FIG. 5 items 138 and 168) and the hotter outer walls (FIG. 6 items 110 and 112).

Figure 5:
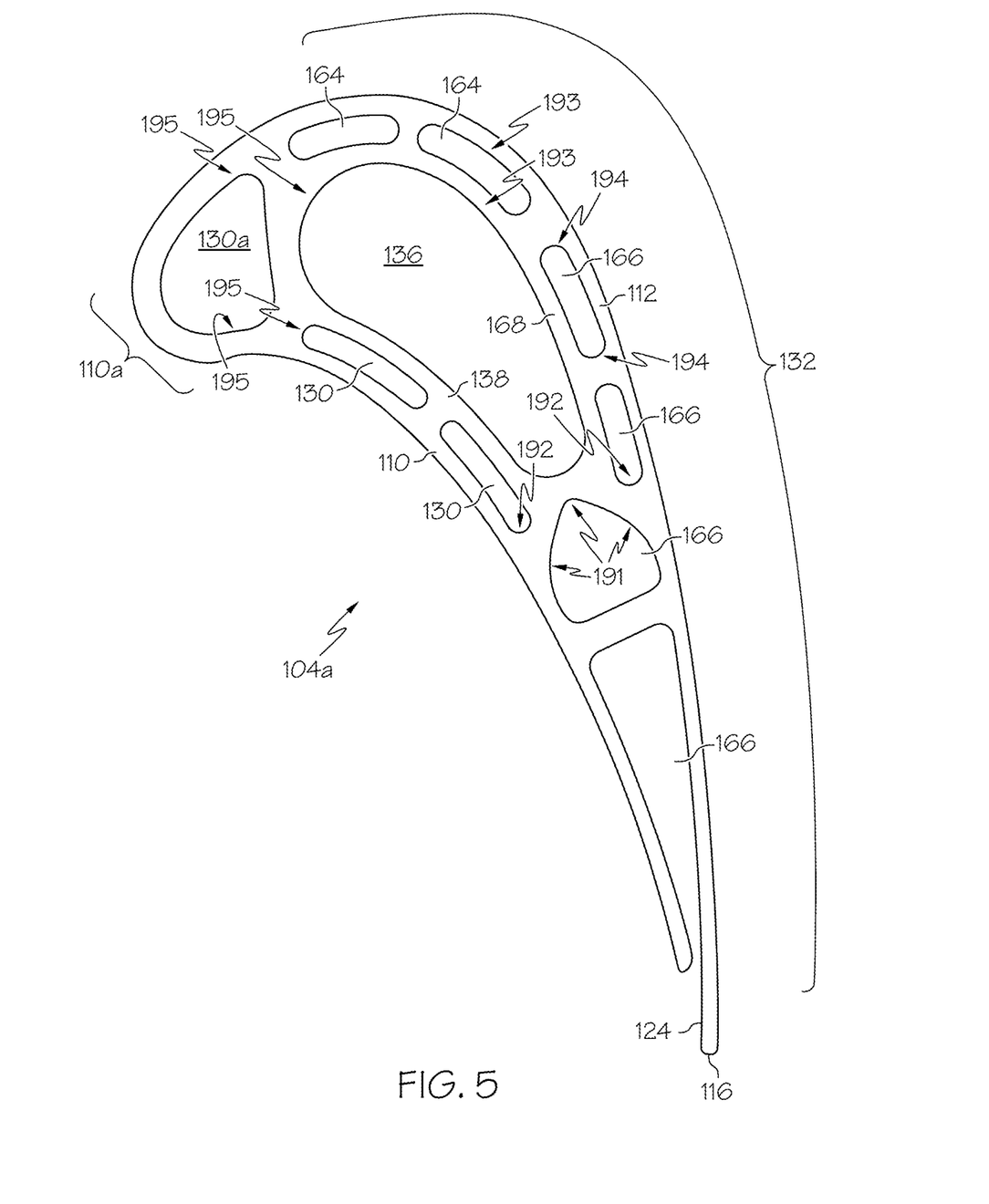
FIG. 5 is a cross-sectional view of a turbine airfoil in accordance with an embodiment.
Figure 6:
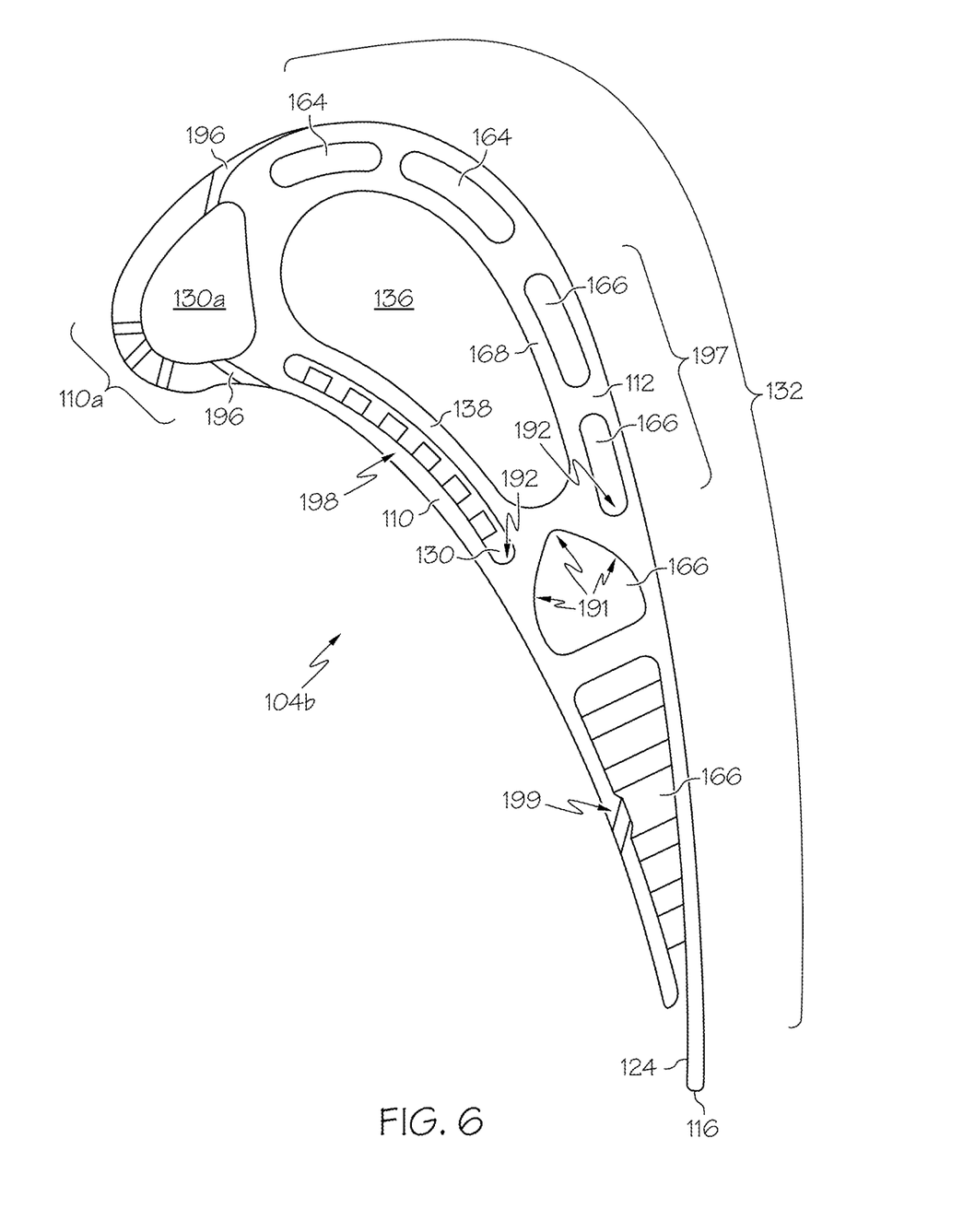
FIG. 6 is another cross-sectional view of a turbine airfoil in accordance with an embodiment.

With reference to FIGS. 5 and 6 (which depict, in cross-section, exemplary airfoils 104a, 104b, respectively), a pressure side flow circuit 130 is defined, in part, by a pressure side wall 110 and an interior wall 138. The interior wall 138 isolates the pressure side flow circuit 130 from the other flow circuits, as will be described below. Additionally, a suction side flow circuit 132 directs cooling air from the root 108 (not shown) along the suction side wall 112 and out one or more of the trailing edge slots 124 or cooling holes (not shown) formed on the pressure side wall 110 and on the blade tip. The suction side flow circuit is divided into a suction side forward flow circuit 164 and a suction side aft flow circuit 166. The suction side forward flow circuit 164 is defined by the suction side wall 112 and an interior wall 168. The suction side aft flow circuit 166 is also defined by the suction side wall 112 and the interior wall 168, but is positioned more aft along the airfoil. Further, the center flow circuit 136 takes air from the root 108 (not shown) and cools internal walls that also define portions of the other flow circuits.

In one embodiment, as further shown in FIGS. 5 and 6, the incorporation of an angled or "wishbone" architecture 191 is provided at a transition region of outer walls 110, 112 to the trailing edge 116. This angled or wishbone architecture 191 provides a compliance transition zone between the hot outer wall stress loop and the cooler inner wall stress loops. In combination with this wishbone architecture, embodiments of the present disclosure may include multi-radius compound fillets 192 at a transition from the outer walls 110, 112 to the wishbone architecture 191 in order to improve load path and reduce stress concentrations.

As illustrated particularly in FIG. 5, in a further aspect of the present disclosure, the thickness of walls 112, 168 (or 110, 138) may be optimized to a ratio between thin, hotter outer walls with thicker, cooler inner walls that balances compliance and stresses around the airfoil. Arrows 193 illustrate the difference in thickness of walls 112, 168 (or 110, 138) at a particular area along the airfoil. For example, in one embodiment, the thickness ratio between walls 112 and 168 (or 110, 138) may be 1:1.2, 1:1.5, 1:2.0, 1:3.0, or any ratio thereinbetween. Walls 112 and 168 (or 110, 138) may further utilize full or multi-radius compound fillets 194 to drive peak stress concentrations towards inner walls where the temperature is lower, thus increasing TMF life. For example, it will be appreciated that a 25° F. temperature reduction can equate to a factor of 2 in TMF life. As further illustrated in FIG. 5, the leading edge portion 130a of the pressure side flow circuit 130 may include stress reduction features 195 in the manner of one or more of: a tapered cavity, multi-radius compound fillets, and/or leading edge wall 110a thickness and curvature optimization (for compliance control around leading edge stress loop), in order to reduce stress concentration at the leading edge portion 130a.

Reference is now made to FIG. 6, which discloses additional features of the airfoil 100 in accordance with certain embodiments. In one aspect, compliance enhancement between walls 110, 138 (or 112, 168) may be provided via a series of pins, indicated generally by reference numeral 198, from the hotter outer wall 110 (or 112) protruding towards the cooler inner wall 138 (or 168) to allow for heat conduction from outer wall 110 (or 112) and stress reduction by elimination of shear and tensile stresses at pin 198 to inner wall 138 (or 168) interfaces.

In a further aspect, as also shown particularly in FIG. 6, the number, location, and thicknesses of the rib fillets (several of which are identified by bracket 197 in FIG. 6) may be optimized to balance stresses in the rib fillets with thermal conduction from hotter outer walls 110, 112 to the cooler inner walls 138, 168. In yet a further aspect, the pressure side aft film cooling row utilizes locally thicker wall (indicated at 199) to reduce background stress and to improve film cooling hole metering and diffusion for enhanced film cooling. Still further, reference numeral 196 identifies exemplary multi-angle forward swept cooling holes as described in greater detail above with regard to FIGS. 3 and 4.

Figure 7:
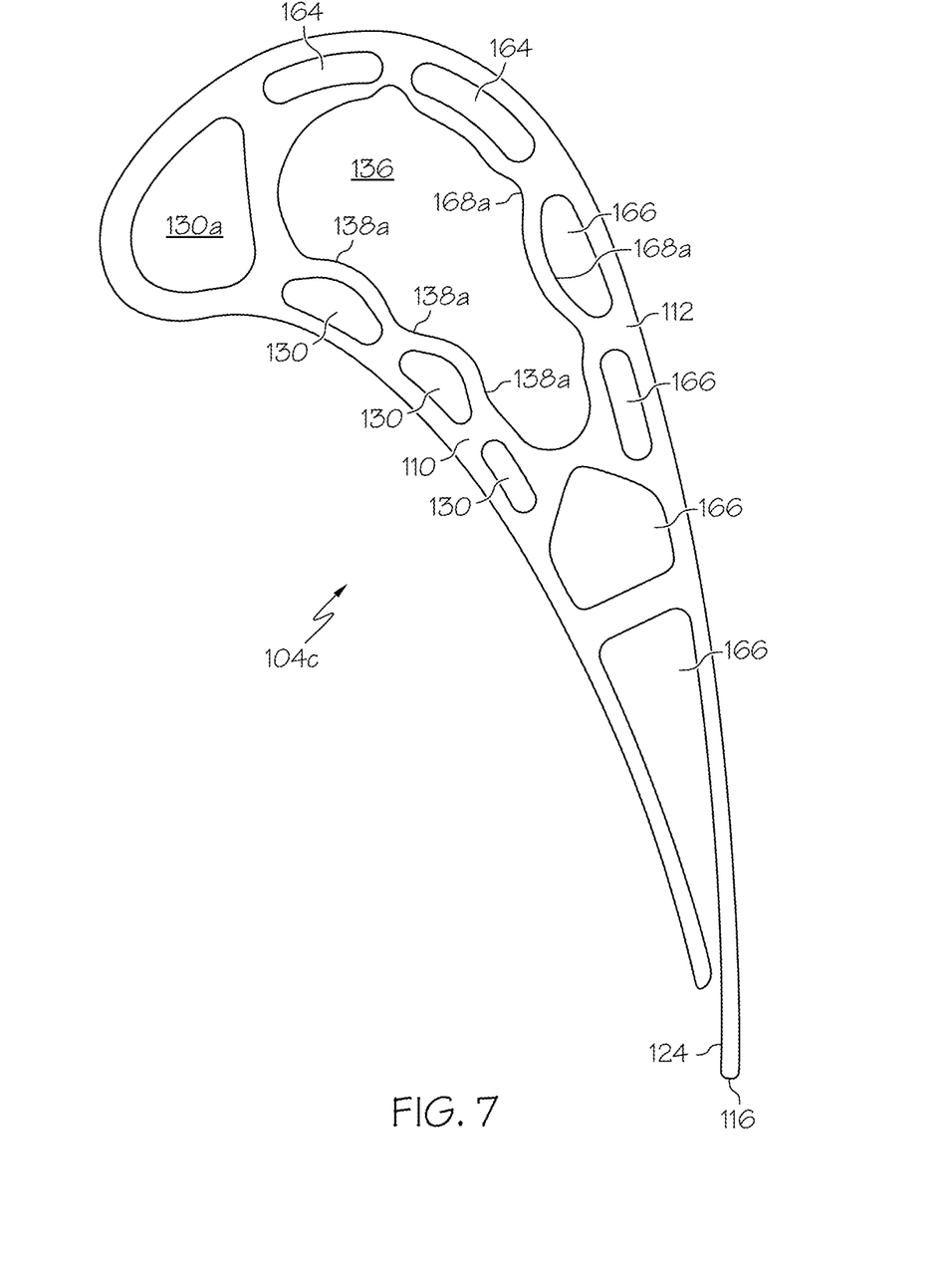
FIG. 7 is yet another cross-sectional view of a turbine airfoil in accordance with an embodiment.

FIG. 7 depicts an alternate embodiment of the present disclosure, illustrated by an airfoil 104c. In this embodiment, curved walls 138a, 168a provide compliance and stress balancing between cooler inner walls and hotter outer walls. For example, curvature may be provided that extends the length of the walls 138a, 168a by 10%, 20%, or 30% (or any percentage thereinbetween) as compared to the straight interior wall (138, 168) embodiments shown with regard to FIGS. 5 and 6. Those skilled in the art may utilize finite element analysis methods for transient thermal and stress analyses to define curvature, relative thicknesses, and fillet parameters to define curvature, relative compliance and resulting stress field to improve TMF life for the component. The reference numerals illustrated in FIG. 7, but not specifically mentioned with regard thereto, illustrate the same components of the airfoil as described above with regard to FIGS. 5 and 6.

Regarding the design and manufacture of the presently disclosed cooled turbine airfoils, the embodiments may be incorporated into multi-walled airfoils using casting technologies known to those skilled in the art. Stress and thermal optimizations may be performed by standard conjugate aerothermal analysis followed by stress analysis with commercially available software such as ANSYS. Machining features are incorporated by standard techniques, including machining, grinding, and electro-discharge machining.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. An air-cooled turbine blade having an airfoil shape, comprising:
   a multi-walled convex suction side wall comprising a convex-side outer wall and a convex-side inner wall, wherein a space between the convex-side outer wall and the convex-side inner wall defines a convex-side cooling air passage;
   a multi-walled concave pressure side wall comprising a concave-side outer wall and a concave-side inner wall, wherein a space between the concave-side outer wall and the concave-side inner wall defines a concave-side cooling air passage, each of the convex-side and concave side inner walls including an interior surface that defines an interior with the blade;
   a suction side flow circuit formed within the convex-side cooling air passage;
   a pressure side flow circuit formed within the concave-side cooling air passage; and
   a plurality of pins at a trailing edge of the blade and positioned aft of the suction side and pressure side flow circuits,
   wherein the turbine blade comprises, in a mid-section extending from the suction side flow circuit and the pressure side flow circuit to the plurality of pins at the trailing edge, a generally Y-shaped cross-section defined with a first end of the Y-shape extending from the suction side flow circuit to the plurality of pins and a second end of the Y-shape extending from the pressure side flow circuit to the plurality of pins, an open space being present between the first and second ends of the Y-shape in the mid-section, and wherein the pressure side flow circuit comprises a plurality of pins positioned on the concave side outer wall of the pressure side flow circuit extending towards, but not in contact with, the concave side inner wall of the pressure side flow circuit.

2. The turbine blade of claim 1, further comprising a variable wall thickness between inner and outer walls of one or both of the suction side flow circuit and the pressure side flow circuit.

3. The turbine blade of claim 1, comprising a plurality of multi-angle forward swept cooling holes.

4. The turbine blade of claim 1, further comprising a platform comprising a first external airfoil fillet on the suction side and a second external airfoil fillet on the pressure side, wherein the external airfoil fillet on the suction side is at least 10% greater in size than the external airfoil fillet on the pressure side.

5. The turbine blade of claim 4, wherein the platform is tapered at an aft end thereof.

* * * * *